United States Patent [19]

Neuert et al.

[11] Patent Number: 5,616,683

[45] Date of Patent: Apr. 1, 1997

[54] PROCESS FOR MAINTAINING OF IMPROVING THE MECHANICAL PROPERTIES OF FIBERS OF AROMATIC COPOLYAMIDES IN ALKALINE MEDIA AND SHAPED ARTICLES CONTAINING SUCH FIBERS

[75] Inventors: Richard Neuert, Winkelhaid; Georg-Emerich Miess, Regensburg, both of Germany

[73] Assignee: Hoechst AG, Frankfurt, Germany

[21] Appl. No.: 181,172

[22] Filed: Jan. 13, 1994

[30] Foreign Application Priority Data

Jan. 13, 1993 [DE] Germany .................. 43 00 626.4

[51] Int. Cl.$^6$ .................. C08F 6/00; D06M 11/00
[52] U.S. Cl. .................. 528/480; 528/488; 528/489; 524/5; 8/115.51; 8/115.54; 8/115.69; 428/395; 428/411.1
[58] Field of Search .................. 524/5; 528/480, 528/488, 489; 8/115.51, 115.69, 115.54; 428/395, 411.1

[56] References Cited

U.S. PATENT DOCUMENTS

| 2,201,741 | 5/1940 | Owens et al. | 8/115.69 |
|---|---|---|---|
| 2,781,242 | 2/1957 | Knapp | 8/115.69 |
| 2,998,296 | 8/1961 | Henneman | 8/115.69 |
| 4,693,749 | 9/1987 | Gale | 8/115.69 |
| 4,847,354 | 7/1989 | Keil et al. | 528/340 |
| 4,974,522 | 12/1990 | Holden et al. | 8/115.69 |
| 5,139,873 | 8/1992 | Rebouillat | 8/115.69 |
| 5,149,759 | 9/1992 | Miess et al. | 528/348 |
| 5,266,672 | 11/1993 | Miess et al. | 528/184 |
| 5,290,907 | 3/1994 | Miess et al. | 528/183 |
| 5,306,782 | 4/1994 | Chang et al. | 8/115.69 |

FOREIGN PATENT DOCUMENTS

| 2084137 | 6/1993 | Canada . |
|---|---|---|
| 2100033 | 1/1994 | Canada . |
| 0199090 | 10/1986 | European Pat. Off. . |
| 0227452 | 7/1987 | European Pat. Off. . |
| 0499230 | 8/1992 | European Pat. Off. . |

OTHER PUBLICATIONS

Chemiefasern/Textilindustrie Bd. 42, Nr. 10, Oct. 1992, Neue Moglichkeiten mit neuen Aramidfasern.

Textile Research Journal, Bd. 62, Nr. 12, Dec. 1992, New Concepts in para–aramid Fibers.

*Primary Examiner*—P. Hampton-Hightower
*Attorney, Agent, or Firm*—Connolly & Hutz

[57] ABSTRACT

A process for maintaining or increasing the tensile strength of fibers of aromatic copolyamides which are formed from a major portion of para-monomers and are soluble in organic aprotic and polar solvents. The process involves storing the fibers in alkaline media after production by wet or dry spinning processes, after treatment of the dry or wet spun fibers, and storing the fibers in an aqueous environment having a pH of at least 10. The tensile strength of the fibers is retained or increased.

24 Claims, No Drawings

PROCESS FOR MAINTAINING OF IMPROVING THE MECHANICAL PROPERTIES OF FIBERS OF AROMATIC COPOLYAMIDES IN ALKALINE MEDIA AND SHAPED ARTICLES CONTAINING SUCH FIBERS

BACKGROUND OF THE INVENTION

1. Field of the Invention

The present invention relates to a process for maintaining or improving the mechanical properties of fibers of aromatic copolyamides in alkaline media, i.e. maintaining or increasing the fiber tensile strength, and those shaped articles containing such fibers and hydraulically setting inorganic materials.

Aromatic polyamides (called aramids below) are known as fiber-forming polymers having a good resistance to chemicals. Fibers of aramids which are built up chiefly from para-monomers furthermore are distinguished by good mechanical properties, such as high tensile strengths and elasticity moduli.

The resistance of commercially available fibers of aramids to acid and alkali sometimes leaves something to be desired, so that such fibers cannot be employed without reservation for the production of composite materials which contain strongly acid or alkaline matrix materials. The drop in tensile strength of fibers of such aramids when stored in strongly acid or alkaline media, such as sulfuric acid or sodium hydroxide solution, is explained by partial hydrolysis of the amide bonds of the polymer (cf. H. H. Yang, Aromatic High-Strength Fibers, pages 248–251 and pages 274–276, J. Wiley & Sons). Nevertheless, aramid fibers have already been disclosed which have a resistance to acid and alkali which is improved compared with conventional aramid fibers and a low moisture uptake and the use of which for reinforcing cement has already been proposed (cf. Technische Textilien, Volume 35, October 1992, T128–T132).

SUMMARY OF THE INVENTION

It has now been found that fibers of certain aromatic copolyamides which are built up chiefly from paramonomers and are soluble in organic aprotic and polar solvents have their tensile strength and other mechanical properties, such as modulus or elongation at break, maintained or increased by treatment with strongly alkaline environments.

This behaviour is all the more surprising since, on the basis of experience with para-aramids which are already known and are soluble only in aggressive media, such as in concentrated sulfuric acid, an increase or maintenance of the mechanical properties with time in a strongly alkaline environment had not been expected but, in contrast, a decrease in these properties.

The present invention relates to a process for maintaining or increasing the tensile strength of fibers of aromatic copolyamides which are built up chiefly from para-monomers and are soluble in organic aprotic and polar solvents in the course of storage in alkaline media, comprising the measures:

a) production of fibers from the said aromatic copolyamides by dry or wet spinning processes which are customary per se, b) after-treatment of the resulting fibers in a manner which is known per se, and c) storage of the fibers in an aqueous environment which has a pH of at least 10, preferably equal to or greater than 12, in particular 12 to 14, for at least a period of time and at a temperature such that the tensile strength of the said fibers, based on the tensile strength of the fibers employed in step c), is at least retained or increased.

The term "aromatic copolyamide which is built up chiefly from para-monomers and is soluble in organic aprotic and polar solvents" in the context of this invention is understood as meaning a copolymide which is soluble in conventional solvents for polyamides, for example in N-methylpyrrolidone, at 25° C. to the extent of at least 4 to 12% by weight, particularly preferably to the extent of 5.0 to 7.5% by weight, and which has at least two aromatic diamine components, in addition to at least one aromatic dicarboxylic acid component.

The dicarboxylic acid component here is chiefly, in particular to the extent of more than 90 mol %, based on the total amount of dicarboxylic acid components in the polymer, derived from divalent aromatic radicals in which the carboxyl groups are in the para-position or comparable coaxial or parallel position.

At least one of the diamine components furthermore is derived from divalent aromatic radicals the amino groups of which are in the para-position or in a comparable coaxial or parallel position; this diamine component, which can also be a mixture of different diamines of this type, is usually contained in the polymer to the extent of at least 50 mol %, based on the total amount of diamine components in the polymer, preferably to the extent of more than 60 mol %, based on the total amount of diamine components in the polymer.

At least one of the diamine components is derived from divalent aromatic radicals the amino groups of which are in the angled position relative to one another, for example in the meta-position or in a comparable angled position relative to one another; this diamine component, which can also be a mixture of various diamines of this type, is usually contained in the polymer to the extent of up to 50 mol %, based on the total amount of diamine components in the polymer, preferably to the extent of less than 40 mol %, based on the total amount of diamine components in the polymer.

The term "customary dry or wet spinning process" in the context of this invention is to be understood as meaning a production process for spun fibers in which solutions of the polymer in an organic aprotic and polar solvent are used during spinning in the broadest sense. Examples of these are dry spinning processes, wet spinning processes or dry wet-jet spinning processes.

The term "after-treatment" in the context of this invention is to be understood as meaning after-treatments which are customary per se on the spun fibers, such as stretching, fixing, washing, preparing and drying.

The period of time and temperature required for the storage is to be determined in each individual case, it being possible to use routine methods.

The storage medium employed for the aramid fibers is usually an aqueous mixture comprising a strongly alkaline inorganic material. Examples of these are mixtures of inorganic materials which set in air and/or by means of water, in particular hydraulically setting materials.

The aramid fibers treated or to be treated according to the invention are preferably employed as a mixture with cement, mortar, concrete or gypsum, if appropriate in combination with organic sealing agents—i.e. in building materials in the broadest sense.

The storage medium is preferably an aqueous solution of an alkali metal hydroxide having the pH defined above, in particular sodium hydroxide solution, or an aqueous slurry or mixture of a hydraulically setting inorganic material, in particular cement or concrete.

An aqueous mixture of a hydraulically setting inorganic material is especially preferably used as the storage medium, and storage is carried out after mixing in of the fibers and shaping of the resulting shaped mixture.

The stored aramid fibers are exposed to temperatures of 20° to 100° C., in particular temperatures of 20° to 60° C., in the strongly alkaline environment. The use temperatures of the resulting shaped articles can be, for example, between −50° C. and +60° C.

The storage period depends on the conditions chosen in the individual case, such as pH of the storage medium and storage temperature. The final state of the increase of the fibers is usually reached within a few days. At higher temperatures, even hours can be sufficient.

No reduction in the tensile strength of the fibers occurs during storage, instead the tensile strength of the fibers is maintained or, in particular, increased typical values of the increase are in the range from 1 to 20%, preferably 2 to 10%.

In addition to the tensile strength, the elongation at break of the fibers as a rule also increases. The elasticity modulus as a rule remains more or less constant.

Shaped articles having high compressive strength and a high energy-absorbing ratio can be produced from these fibers.

Aramid fibers which, before storage in the inorganic matrix, have a tensile strength of at least 120 cN/tex, in particular 150 to 290 cN/tex, especially 150 to 250 cN/tex, and an elasticity modulus, based on 100% elongation, of more than 30 N/tex, in particular 45 to 100 N/tex, especially 45 to 90 N/tex, are preferably employed in the process according to the invention.

Aromatic copolyamides which are particularly preferably employed in the process according to the invention are those which have an intrinsic viscosity of at least 2.4 dl/g, preferably 3.0 to 6.5 dl/g (measured on solutions of 0.5 g of polyamide in 100 ml of 98% strength by weight sulfuric acid at 25° C.) and contain at least the recurring structural units of the formulae I, II and III $$(-OC-Ar-CO-NH-Ar'-NH-) \quad (I)$$

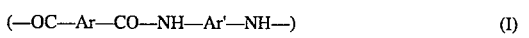
(II)

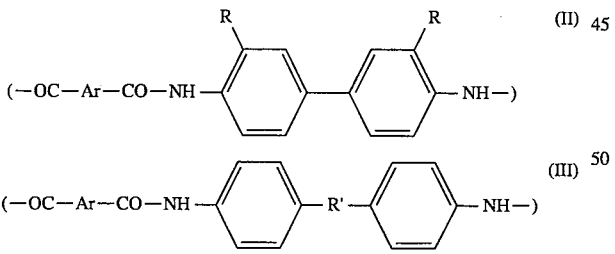
(III)

in which
—Ar— and —Ar'— are divalent organic radicals in which the valency bonds are in the para-position or a comparable coaxial or parallel position relative to one another, R is a $C_1$–$C_4$-alkyl radical, in particular methyl, a $C_1$–$C_4$-alkoxy radical, in particular methoxy, or a chlorine atom, R' is an unsubstituted or alkyl-substituted methylene radical or a grouping —O—Ar—O—, in which —Ar— assumes the meaning defined above, and the proportions of the recurring structural units I, II and III, based on the total amount of these structural units in the polymer, lie within a range defined by the following corner points:

point Q corresponding to 5 mol % of structural units of the formula I, 45 mol % of structural units of the formula II and 50 mol % of the structural units of the formula III, point R corresponding to 45 mol % of structural units of the formula I, 5 mol % of structural units of the formula II and 50 mol % of structural units of the formula III, point S corresponding to 60 mol % of structural units of the formula I, 35 mol % of structural units of the formula II and 5 mol % of structural units of the formula III, point T corresponding to 20 mol % of structural units of the formula I, 75 mol % of structural units of the formula II and 5 mol % of structural units of the formula III, and point U corresponding to 5 mol % of structural units of the formula I, 80 mol % of structural units of the formula II and 15 mol % of structural units of the formula III.

Aramids of this type are known from EP-A-199,090, to which the present description likewise relates.

Types of these aramids which are particularly preferably employed are those in which —Ar— and —Ar'— are 1,4-phenylene, the symbols R are methoxy or chlorine or, in particular, methyl and R' is —O—1,4-phenylene—O—, the proportions of the amounts of the recurring structural units, based on the total amount of these structural units within the polymer, lying within the following ranges:

recurring structural unit of the formula I: 5 to 60 mol %, preferably 15 to 45 mol %, recurring structural unit of the formula II: 5 to 80 mol %, preferably 20 to 70 mol %, and recurring structural unit of the formula III: 5 to 50 mol %, preferably 15 to 50 mol %.

Aromatic copolyamides which are likewise particularly preferably employed in the process according to the invention are those which have an intrinsic viscosity of at least 2.4 dl/g, preferably 3.0 to 6.5 dl/g (measured on solutions of 0.5 g of polyamide in 100 ml of 98% strength by weight sulfuric acid at 25° C.) and contain at least the recurring structural units of the formulae I, IV and V $$(-OC-Ar-CO-NH-Ar'-NH-) \quad (I)$$

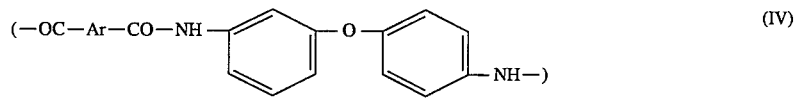
(IV)

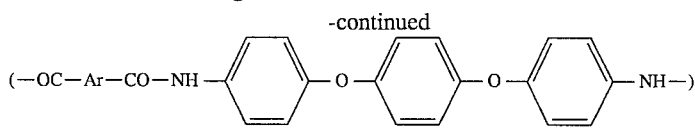

$$(-OC-Ar-CO-NH-\phantom{X}-O-\phantom{X}-O-\phantom{X}-NH-) \quad (V)$$

in which —Ar— and —Ar'— have the meanings defined above, and the proportions of the recurring structural units I, IV and V, based on the total amount of these structural units in the polymer, lie within the following ranges:

recurring structural unit of the formula I: 40 to 65 mol %, preferably 45 to 55 mol %, recurring structural unit of the formula IV: 5 to 55 mol %, preferably 35 to 45 mol %, and recurring structural unit of the formula V: 5 to 35 mol %, preferably 5 to 25 mol %.

Aramids of this type are known from EP-A-499,230, to which the present description likewise relates.

Types of these aramids which are particularly preferably employed are those in which —Ar— and —Ar'— are 1,4-phenylene.

The aramid fibers can be stored in the form of chopped fibers, staple fibers or continuous filaments for carrying out the process according to the invention. Staple fibers have, for example, a staple length of 1.5 to 48 mm, preferably 3 to 24 mm, in particular 4 to 12 mm. Shaped articles containing continuous filaments can be, for example, unidirectionally reinforced shaped articles or shaped articles reinforced by the winding process.

The process according to the invention is not subject to limitations in respect of the fiber linear density. Typical fiber linear densitys are above 1.0 dtex, preferably in the range from 1.7 to 15 dtex.

Continuous filaments are in general stored as multifilaments. The overall linear density thereof is typically in the range from 220 to 18,400 dtex, preferably 840 to 3360 dtex. It has been found that the increase in strength is more pronounced when multifilaments of higher overall linear densitys are employed, and for this reason the use of such multifilaments is particularly preferred.

Staple fibers can be mixed into the matrix using conventional mixing units; thus, for example, staple fibers can be stored in the matrix of hydraulically setting materials by means of the positive mixers, plough share mixers and other such mixers which are customary in practice. The matrix is preferably in the form of an inorganic material, such as in the form of fine contents, such as gypsum, cement or limestone flour, up to coarse constituents, such as sand, gravel and stones. The mixing into the inorganic material can be carried out in the dry or moist state.

Multifilaments can likewise be incorporated into the matrix by processes which are known per se, for example by storing preshaped articles of multifilaments with hydraulically setting materials; after setting, these give the desired shaped article. These are preferably unidirectionally reinforced shaped articles or shaped articles reinforced by the winding process.

It has furthermore been found that the maintenance or increase in tensile strength is essentially retained during long-term storage. The improvement in the properties of the fibers can be utilized, in particular, in the production and use of shaped articles which are produced from a combination of the aramid fibers to be used according to the invention and an aqueous mixture of a hydraulically setting inorganic material. The invention therefore also relates to the shaped articles obtainable in this manner.

The fibers treated or to be treated according to the invention can be employed for the production of gypsum, cement, mortars, plasters, screed or concrete.

The following examples illustrate the invention without limiting it.

General Working Instructions

Multifilaments which comprise an aramid based on 100 mol % of terephthalic acid, 25 mol % of para-phenylenediamine, 25 mol % of 1,4-bis(4-aminophenoxy)benzene and 50 mol % of 3,3'-dimethylbenzidine (aramid I) or an aramid based on 100 mol % of terephthalic acid, 50 mol % of para-phenylenediamine, 15 mol % of 1,4-his (4-aminophenoxy) benzene and 35 mol % of 3,4'-diaminodiphenyl ether (aramid II) are employed in the following examples.

The fiber tow is produced by a customary wet spinning process by spinning of a polymer solution in N-methylpyrrolidone into a precipitating bath and after-treatment comprising washing, stretching and drying.

Storage is carried out in cement filtrate Portland Cement PZ 35 (200 g in 1 l of water).

EXAMPLES 1–4

A fiber tow of aramid I of overall linear density 1680 dtex is stored for 24 hours in cement filtrate of pH 12.5 at various temperatures. The tensile strengths, moduli and elongations at break of the specimens after storage are shown in Table 1. Example 1 shows the values for the untreated fiber.

TABLE 1

| Example No. | 1 | 2 | 3 | 4 |
| --- | --- | --- | --- | --- |
| Storage temperature (°C.) | — | 22 | 60 | 95 |
| Tensile strength (cN/tex) | 204 | 221 | 226 | 230 |
| Modulus (N/tex) | 60.3 | 60.7 | 60.2 | 58.5 |
| Elongation at break (%) | 3.4 | 3.7 | 3.8 | 4.0 |

EXAMPLES 5–8

A fiber tow of aramid I of overall linear density 1100 dtex is stored for 24 hours in sodium hydroxide solution of various pH values at 60° C. The tensile strengths, moduli and elongations at break of the specimens after storage are shown in Table 2. Example 5 shows the values for the untreated fiber.

TABLE 2

| Example No. | 5 | 6 | 7 | 8 |
| --- | --- | --- | --- | --- |
| pH | — | 10 | 12 | 14 |
| Tensile strength (cN/tex) | 196 | 203 | 201 | 207 |
| Modulus (N/tex) | 60.3 | 60.2 | 59.1 | 58.5 |
| Elongation at break (%) | 3.5 | 3.6 | 3.6 | 3.8 |

EXAMPLES 9–12

A fiber tow of aramid I of overall linear density 1680 dtex is stored for 24 hours in sodium hydroxide solution of various pH values at 60° C. The tensile strengths, moduli and elongations at break of the specimens after storage are shown in Table 3. Example 9 shows the values for the untreated fiber.

TABLE 3

| Example No. | 9 | 10 | 11 | 12 |
|---|---|---|---|---|
| pH | — | 10 | 12 | 14 |
| Tensile strength (cN/tex) | 204 | 207 | 229 | 231 |
| Modulus (N/tex) | 60.3 | 60.4 | 61.2 | 61.4 |
| Elongation at break (%) | 3.4 | 3.5 | 3.9 | 3.9 |

EXAMPLES 13–16

A fiber tow of aramid II of overall linear density 1100 dtex is stored for 24 hours in sodium hydroxide solution of various pH values at 60° C. The tensile strengths, moduli and elongations at break of the specimens after storage are shown in Table 4. Example 13 shows the values for the untreated fiber.

TABLE 4

| Example No. | 13 | 14 | 15 | 16 |
|---|---|---|---|---|
| pH | — | 10 | 12 | 14 |
| Tensile strength (cN/tex) | 225 | 228 | 230 | 231 |
| Modulus (N/tex) | 47.4 | 46 | 47 | 46 |
| Elongation at break (%) | 4.6 | 4.8 | 4.8 | 4.9 |

EXAMPLES 17–20

A fiber tow of aramid I of overall linear density 1100 dtex is stored for 24 hours in cement filtrate of pH 12.5 at various temperatures. The tensile strengths, moduli and elongations at break of the specimens after storage are shown in Table 5. Example 17 shows the values for the untreated fiber.

TABLE 5

| Example No. | 17 | 18 | 19 | 20 |
|---|---|---|---|---|
| Storage temperature (°C.) | — | 22 | 60 | 95 |
| Tensile strength (cN/tex) | 196 | 206 | 213 | 211 |
| Modulus (N/tex) | 60.3 | 59.9 | 59.3 | 57.0 |
| Elongation at break (%) | 3.5 | 3.6 | 3.7 | 3.9 |

EXAMPLES 21–24

A fiber tow of aramid II of overall linear density 1100 dtex is stored for 24 hours in cement filtrate of pH 12.5 at various temperatures. The tensile strengths, moduli and elongations at break of the specimens after storage are shown in Table 6. Example 21 shows the values for the untreated fiber.

TABLE 6

| Example No. | 21 | 22 | 23 | 24 |
|---|---|---|---|---|
| Storage temperature (°C.) | — | 22 | 60 | 95 |
| Tensile strength (cN/tex) | 225 | 230 | 229 | 225 |
| Modulus (N/tex) | 47.4 | 45.6 | 45.7 | 45.2 |
| Elongation at break (%) | 4.6 | 4.9 | 4.8 | 4.8 |

EXAMPLES 25–35

A fiber tow of aramid I of overall linear density 1680 dtex is stored for a relatively long period of time in cement filtrate of pH 12.5 at 80° C. Fiber specimens are taken from time to time and their mechanical properties are determined. The tensile strengths, moduli and elongations at break of the specimens stored for various periods of time are shown in Table 7.

TABLE 7

| Example no. | 25 | 26 | 27 | 28 | 29 | 30 | 31 | 32 | 33 | 34 | 35 |
|---|---|---|---|---|---|---|---|---|---|---|---|
| Storage time (days) | 0 | 1 | 2 | 3 | 4 | 5 | 9 | 15 | 20 | 26 | 30 |
| Tensile strength (cN/tex) | 210 | 214 | 221 | 227 | 230 | 227 | 228 | 227 | 228 | 228 | 232 |
| Modulus (N/tex) | 60.3 | 58.5 | 59 | 58.2 | 58.2 | 58.0 | 58.6 | 59.0 | 58.0 | 58.2 | 59.3 |
| Elongation at break (%) | 3.4 | 3.8 | 3.9 | 4.0 | 4.0 | 4.0 | 4.0 | 3.9 | 4.0 | 4.0 | 4.0 |

EXAMPLES 36–46

A fiber tow of aramid I of overall linear density 1100 dtex is stored for a relatively long period of time in cement filtrate of pH 12.5 at 80° C. Fiber specimens are taken from time to time and their mechanical properties are determined. The tensile strengths, moduli and elongations at break of the specimens stored for various periods of time are shown in Table 8.

TABLE 8

| Example no. | 36 | 37 | 38 | 39 | 40 | 41 | 42 | 43 | 44 | 45 | 46 |
|---|---|---|---|---|---|---|---|---|---|---|---|
| Storage time (days) | 0 | 1 | 2 | 3 | 4 | 5 | 9 | 15 | 20 | 26 | 30 |
| Tensile strength | 201 | 209 | 211 | 206 | 211 | 212 | 212 | 210 | 209 | 212 | 213 |

TABLE 8-continued

| Example no. | 36 | 37 | 38 | 39 | 40 | 41 | 42 | 43 | 44 | 45 | 46 |
|---|---|---|---|---|---|---|---|---|---|---|---|
| (cN/tex) | | | | | | | | | | | |
| Modulus (N/tex) | 60 | 58.0 | 57.0 | 58.0 | 58 | 58.8 | 59.3 | 57.4 | 57.9 | 58.1 | 58.2 |
| Elongation at break (%) | 3.5 | 3.7 | 3.9 | 3.7 | 3.8 | 3.8 | 3.7 | 3.8 | 3.8 | 3.8 | 3.8 |

EXAMPLES 47–57

A fiber tow of aramid II of overall linear density 1100 dtex is stored for a relatively long period of time in cement filtrate of pH 12.5 at 80° C. Fiber specimens are taken from time to time and their mechanical properties are determined. The tensile strengths, moduli and elongations at break of the specimens stored for various periods of time are shown in Table 9.

TABLE 9

| Example no. | 47 | 48 | 49 | 50 | 51 | 52 | 53 | 54 | 55 | 56 | 57 |
|---|---|---|---|---|---|---|---|---|---|---|---|
| Storage time (days) | 0 | 1 | 2 | 3 | 4 | 5 | 9 | 15 | 20 | 26 | 30 |
| Tensile strength (cN/tex) | 212 | 220 | 215 | 214 | 218 | 215 | 225 | 221 | 217 | 225 | 221 |
| Modulus (N/tex) | 45.1 | 45.0 | 44.0 | 45.0 | 44.0 | 44.1 | 45.2 | 45.8 | 44.7 | 45.1 | 44.2 |
| Elongation at break (%) | 4.7 | 4.5 | 4.7 | 4.5 | 4.7 | 4.7 | 4.8 | 4.6 | 4.7 | 4.8 | 4.7 |

EXAMPLES 58–65

Multifilaments which comprise an aramid based on 100 mol % of terephthalic acid, 50 mol % of para-phenylenediamine and 50 mol % of 3,4'-diaminodiphenyl ether were employed in the following examples.

The multifilament is a fiber tow wet-spun and after-treated by the customary process. Storage was carried out in cement filtrate: Portland Cement PZ 35 (200 g in 1 l of water).

EXAMPLES 58–61

A fiber tow of filaments of the aramid characterized above of overall linear density 1700 dtex was stored for 24 hours in cement filtrate of pH 12.5 at various temperatures. The tensile strengths, moduli and elongations at break of the specimens after storage are shown in the following table. Example 58 shows the values for the untreated fiber.

| Example No. | 58 | 59 | 60 | 61 |
|---|---|---|---|---|
| Storage temperature (°C.) | — | 22 | 60 | 95 |
| Tensile strength (cN/tex) | 225 | 225 | 235 | 240 |
| Modulus (N/tex) | 60 | 60 | 60 | 60 |
| Elongation at break (%) | 4 | 4 | 4 | 4 |

EXAMPLES 62–65

A fiber tow of filaments of the aramid characterized above of overall linear density 1700 dtex was stored for 24 hours in sodium hydroxide solution of various pH values at 60° C. The tensile strengths, moduli and elongations at break of the specimens after storage are shown in the following table. Example 62 shows the values for the untreated fiber.

| Example No. | 62 | 63 | 64 | 65 |
|---|---|---|---|---|
| pH | — | 10 | 12 | 14 |
| Tensile strength (cN/tex) | 225 | 230 | 245 | 245 |
| Modulus (N/tex) | 60 | 60 | 60 | 60 |
| Elongation at break (%) | 4 | 4 | 4 | 4 |

We claim:

1. A process for maintaining or increasing the tensile strength of fibers of aromatic copolyamides which contain a major portion of para-monomers and are soluble in organic aprotic and polar solvents, in the course of storage in alkaline media, comprising the steps of:
   a) producing fibers from the aromatic copolyamides by dry or wet spinning processes,
   b) after treating the produced fibers, and
   c) storing the after treated fibers, which fibers have an initial tensile strength of at least 120 cN/tex and an initial elasticity modulus based on 100% elongation, of more than 30 N/tex before storage, in an aqueous environment which has a pH of at least 10 for at least a period of time and at a temperature such that the tensile strength of the said fibers, based on the tensile strength of the fibers employed in step c), is at least retained or increased.

2. The process as claimed in claim 1, wherein the storage of the fibers in step c) is carried out at least for a period of time and at a temperature such that the tensile strength of the said fibers, based on the tensile strength of the fibers employed in step c), is increased by at least 1%.

3. The process as claimed in claim 1, wherein the aqueous environment has a pH equal to or greater than 12.

4. The process as claimed in claim 3, wherein an aqueous solution of an alkali metal hydroxide, or an aqueous slurry or mixture of a hydraulically setting inorganic material is used as the aqueous environment.

5. The process as claimed in claim 4, wherein an aqueous mixture of a hydraulically setting inorganic material is used as the storage medium and storage is carried out after mixing in of the fibers and after shaping of the resulting mixture.

6. The process as claimed in claim 1, wherein the step of storing the after-treated fibers is carried out at a temperature of 20° to 100° C.

7. The process as claimed in claim 1, wherein an aromatic copolyamide is employed which has an intrinsic viscosity of at least 2.4 dl/g (measured on solutions of 0.5 g of polyamide in 100 ml of 98% strength by weight sulfuric acid at 25° C.) and additionally contains at least the recurring structural units of the formulae I, II and III shown below:

(—OC—Ar—CO—NH—Ar'—NH—)     (I)

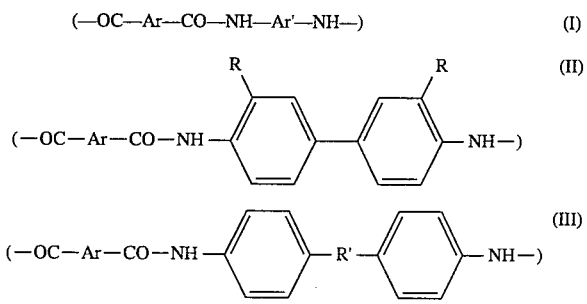

in which
- —Ar— and —Ar'— are divalent organic radicals in which the valency bonds are in the para- position or a comparable coaxial or parallel position relative to one another,
- R is a $C_1$–$C_4$-alkyl radical a $C_1$–$C_4$-alkoxy radical or a chlorine atom,
- R' is an unsubstituted or alkyl-substituted methylene radical or a grouping —O—Ar—O—, in which
  - —Ar— assumes the meaning defined above, and the proportions of the recurring structural units I, II and III, based on the total amount of these structural units in the polymer, lie within a range defined by the following corner points:
    - point Q corresponding to 5 mol % of structural units of the formula I, 45 mol % of structural units of the formula II and 50 mol % of the structural units of the formula III,
    - point R corresponding to 45 mol % of structural units of the formula I, 5 mol % of structural units of the formula II and 50 mol % of the structural units of the formula III,
    - point S corresponding to 60 mol % of structural units of the formula I, 35 mol % of structural units of the formula II and 5 mol % of the structural units of the formula III,
    - point T corresponding to 20 mol % of structural units of the formula I, 75 mol % of structural units of the formula II and 5 mol % of the structural units of the formula III, and
    - point U corresponding to 5 mol % of structural units of the formula I, 80 mol % of structural units of the formula II and 15 mol % of the structural units of the formula III.

8. The process as claimed in claim 7, wherein —Ar— and —Ar'— are 1,4-phenylene, R is methoxy or chlorine or, and R' is —O—1,4—phenylene—O—, the proportions of the amounts of the recurring structural units, based on the total amount of these structural units with the polymer, lying within the following ranges:

recurring structural unit of the formula I: 15 to 45 mol %, recurring structural unit of the formula II: 20 to 70 mol %, and recurring structural unit of the formula III: 15 to 50 mol %.

9. The process as claimed in claim 1, wherein the aromatic copolyamide employed is a copolymer which has an intrinsic viscosity of 2.4 to 6.5 dl/g (measured on solutions of 0.5 g of polyamide in 100 ml of 98% strength by weight sulfuric acid at 25° C.) and additionally contains at least the recurring structural units of the formula I, IV and V shown below:

(—OC—Ar—CO—NH—Ar'—NH—)     (I)

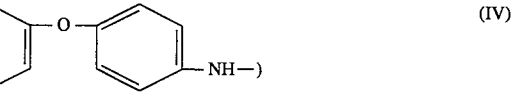

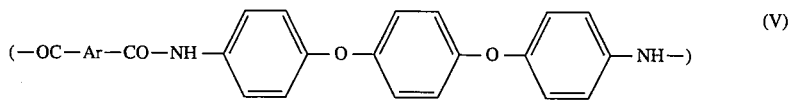

in which —Ar— and —Ar'— are divalent organic radicals in which the valency bonds are in the para- position or a comparable coaxial or parallel position relative to one another, and the proportions of the recurring structural units I, IV and V, based on the total amount of these structural units in the polymer, lie within the following ranges:

recurring structural unit of the formula I: 40 to 65 mol %, recurring structural unit of the formula IV: 5 to 55 mol %, and recurring structural unit of the formula V: 5 to 35 mol %.

10. The process as claimed in claim 9, wherein —Ar— and —Ar'— are 1,4-phenylene, and wherein the proportions of the amounts of the recurring structural units, based on the total amount of these structural units within the polymer, lie within the following ranges:

recurring structural unit of the formula I: 45 to 55 mol %, recurring structural unit of the formula IV: 35 to 45 mol %, and recurring structural unit of the formula V: 5 to 25 mol %.

11. The process as claimed in claim 1, wherein an aromatic copolyamide is employed which additionally has an intrinsic viscosity of at least 2.4 dl/g (measured on solutions of 0.5 g of polyamide in 100 ml of 98% strength by weight sulfuric acid at 25° C.) and additionally contains at least the recurring structural units of the formula I and VI as shown below:

(OC—Ar—CO—NH—Ar'—N—H)     (I)

and

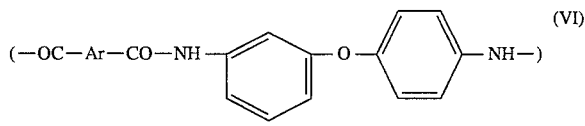
(VI)

in which Ar and Ar' have the meanings defined in claim 8 and the proportions of the recurring structural units I and VI, based on the total amount of these structural units in the polymers, lie within the following ranges:

formula I: 50 to 60 mol %; formula VI: 40 to 50 mol %.

12. A shaped article, obtainable by the process as claimed in claim 6.

13. The shaped article as claimed in claim 12, which contains multifilaments.

14. The shaped article as claimed in claim 12, which contains staple fibers.

15. The process as claimed in claim 1, further comprising the step of incorporating said treated fibers into gypsum, cement, mortars, plasters, screed, or concrete.

16. The process as claimed in claim 1, wherein the step of storing the after-treated fibers in step c) is carried out at least for a period of time and at a temperature such that the tensile strength of the said fibers, based on the tensile strength of the fibers employed in step c), is increased by 2 to 10%.

17. The process as claimed in claim 1, wherein the aqueous environment has a pH from 12 to 14.

18. The process as claimed in claim 3, wherein an aqueous slurry or mixture of concrete or cement is used as the aqueous environment.

19. The process as claimed in claim 1, wherein the step of storing the after-treated fibers is carried out at a temperature of 20° to 60° C.

20. The shaped article as claimed in claim 12, which contains multifilaments having an overall linear density of 840 to 18,000 dtex.

21. The process as claimed in claim 3, wherein an aqueous solution of sodium hydroxide is the aqueous environment.

22. A process as claimed in claim 7, wherein R is methyl.

23. A process as claimed in claim 7, wherein R is methoxy.

24. A process as claimed in claim 8, wherein R is methyl.

\* \* \* \* \*